United States Patent
Tanaka et al.

[11] Patent Number: 5,898,252
[45] Date of Patent: Apr. 27, 1999

[54] DYNAMOELECTRIC MACHINE ROTOR AND METHOD FOR PREPARING IT

[75] Inventors: Kazunori Tanaka; Kyoko Kurusu; Katsumi Adachi, all of Himeji, Japan

[73] Assignee: Mitsubishi Denki Kabushiki Kaisha, Tokyo, Japan

[21] Appl. No.: 08/425,738

[22] Filed: Apr. 20, 1995

[30] Foreign Application Priority Data

Oct. 5, 1994 [JP] Japan ................................. 6-241698

[51] Int. Cl.⁶ ........................................................ H02K 3/00
[52] U.S. Cl. ........................... 310/214; 310/43; 310/194; 310/208; 29/596; 29/598
[58] Field of Search ............................. 310/43, 45, 208, 310/214, 194; 29/596, 598

[56] References Cited

U.S. PATENT DOCUMENTS

| | | | |
|---|---|---|---|
| 3,391,294 | 7/1968 | Moxie et al. | 310/214 |
| 3,824,940 | 7/1974 | Habegger et al. | 112/121.2 |
| 4,008,409 | 2/1977 | Rhudy et al. | 310/45 |
| 4,204,181 | 5/1980 | Smith et al. | 336/96 |
| 4,224,541 | 9/1980 | Smith et al. | 310/45 |
| 4,275,319 | 6/1981 | Davis, Jr. | 310/43 |
| 4,400,226 | 8/1983 | Horrigan | 156/56 |
| 4,545,843 | 10/1985 | Bray | 156/322 |
| 4,602,424 | 7/1986 | Kindig | 29/596 |
| 4,616,407 | 10/1986 | Tamaki et al. | 29/596 |
| 4,806,806 | 2/1989 | Hjortsberg et al. | 310/45 |
| 4,808,872 | 2/1989 | Lund et al. | 310/215 |
| 5,050,924 | 9/1991 | Hansen | 296/100 |
| 5,081,383 | 1/1992 | Kusumoto et al. | 310/59 |
| 5,416,373 | 5/1995 | Maruyama et al. | 310/208 |
| 5,417,787 | 5/1995 | Tanaka | 156/187 |
| 5,426,520 | 6/1995 | Huber | 310/260 |
| 5,436,520 | 7/1995 | Huber | 310/260 |
| 5,473,208 | 12/1995 | Stihi | 310/68 D |

FOREIGN PATENT DOCUMENTS

| | | | |
|---|---|---|---|
| 0012566 | 6/1980 | European Pat. Off. | H02K 3/30 |
| 0019815 | 12/1980 | European Pat. Off. | H02K 3/34 |
| 0062602 | 10/1982 | European Pat. Off. | H02K 3/30 |
| 0116367 | 8/1984 | European Pat. Off. | H01F 41/12 |
| 0368038 | 5/1990 | European Pat. Off. | H02K 3/34 |
| 123459 | 8/1989 | Japan | H02K 3/34 |
| 567074 | 1/1945 | United Kingdom | H02K 3/34 |
| 901016 | 7/1962 | United Kingdom | H02K 3/34 |
| 1114506 | 5/1968 | United Kingdom | H01F 5/00 |
| 2209879 | 5/1989 | United Kingdom | H02K 3/32 |

*Primary Examiner*—Nestor Ramirez
*Assistant Examiner*—Michael J. Wallace, Jr.
*Attorney, Agent, or Firm*—Sughrue, Mion, Zinn, Macpeak & Seas, PLLC

[57] ABSTRACT

A dynamoelectric machine rotor comprising a rotary shaft; a field core member engaged with the rotary shaft; a field coil wound on the field core member through a bobbin; and an outer circumferential tape which is wound on an outer circumference of the field coil to prevent the field coil from unwinding; wherein the outer circumferential tape includes a substrate sheet which is provided with at least one of a recess and a projection.

22 Claims, 16 Drawing Sheets

DYNAMOELECTRIC MACHINE ROTOR AND METHOD FOR PREPARING IT

The present invention relates to a rotor of a dynamoelectric machine such as an a.c. generator used for vehicles, and a method for preparing the rotor.

Referring to FIG. 13, there is shown a cross-sectional view of the rotor of a conventional a.c. generator for vehicles. Referring to FIG. 14, there is shown a perspective view of a coil assembly of the rotor. In those Figures, reference numeral 1 designates a rotary shaft which is supported by brackets of the a.c. generator not shown. Reference numerals 2a and 2b field cores, which have outer circumferential portions provided with a plurality of pole claws and inner circumferential portions formed with annular channels, which are coupled to form a field core member, and which are carried on and engaged with the rotary shaft 1 in such a manner that the pole claws alternately mesh one another to be opposed. Reference numeral 3 designates a coil assembly (hereinbelow, referred to as the coil ASSY). Reference numeral 31 designates a field coil, which is wound on an inner circumferential tape 34 after the tape is wound on a bobbin 32, which has an outer circumferential tape 35 wound thereon, and which is fixed on the rotary shaft 1 together with the field cores 2a and 2b. The field coil 31 has a wind-start portion 31a drawn out along a groove formed on a side of the bobbin 32, and has a side tape 33 interposed between the wind-start portion and a winding portion. Reference numerals 4a and 4b designate cooling fans, which are fixed on sides of the field cores 2a and 2b. Reference numeral 5 designates a current collector, which is carried on and engaged with the rotary shaft 1 together with the field cores 2a and 2b.

The bobbin 32 is made from of e.g. a heat-resistant nylon material. The outer circumferential tape 35 has a coil opposing surface formed as an adhesive surface, and the other surface formed as a nonadhesive surface to improve operating performance. The outer circumferential tape is formed by having a nonwoven fabric piece as a substrate impregnated with an adhesive epoxy resin, and then applying a nonadhesive epoxy resin to one of the fabric surfaces. In addition, after assembling the coil ASSY, the outer circumferential tape is subject to a heating process to have the resin melted. Then, the resin is hardened to constitute the field coil into a substantially single unit.

As stated, the conventional rotor has the inner circumference and the outer circumference of the field coil completely covered by the tape, thereby to prevent heat build-up in the winding due to electric power generation from dissipating, causing cooling performance to deteriorate and the performance of the generator to lower. If the outer circumferential tape is eliminated in order to improve cooling performances a centrifugal force which is applied to the field coil could cause unwinding and cut off the field coil.

It is an object of the present invention to solve this problem, and to provide an a.c. generator rotator for vehicles capable of improving cooling performance of a field coil and of preventing the field coil from being unwound due to a centrifugal force, and to provide a method for preparing the rotor.

In accordance with the present invention, there is provided a dynamoelectric machine rotor comprising a rotary shaft; a field core member engaged with the rotary shaft; a field coil wound on the field core member through a bobbin; and an outer circumferential tape which is wound on an outer circumference of the field coil to prevent the field coil from unwinding; wherein the outer circumferential tape includes a substrate sheet which is provided with at least one of a recess and a projection.

The recess may be a hole.

The recess can be provided by making the substrate sheet of a netlike sheet.

There is also provided a dynamoelectric machine rotor comprising a rotary shaft; a field core member engaged with the rotary shaft; a field coil wound on the field core member through a bobbin; and an outer circumferential tape which is wound on an outer circumference of the field coil to prevent the field coil from unwinding; wherein the outer circumferential tape is provided with a hole.

There is further provided a dynamoelectric machine rotor comprising a rotary shaft; a field core member engaged with the rotary shaft; a field coil wound on the field core member through a bobbin; and an outer circumferential tape which is made of a resin, and which is wound on an outer circumference of the field coil to prevent the field coil from unwinding; wherein the outer circumferential tape is melted by a heat treatment.

There is still further provided a dynamoelectric machine rotor comprising a rotary shaft; a field core member engaged with the rotary shaft; a field coil wound on the field core member through a bobbin; and a tape which is continuously wound on an inner circumferences sides and an outer circumference of a wound unit of the field coil to prevent the field coil from unwinding; wherein the tape is provided at least at a coil wind-start portion and a coil wind-completion portion.

The tape may comprise the outer circumferential tape which includes a substrate sheet with a recess or a projections or which has a hole formed therein.

There is still further provided a dynamoelectric machine rotor comprising a rotary shaft; a field core member engaged with the rotary shaft; a field coil wound on the field core member through a bobbin; and a cord for fixing the field coil, which has a resin impregnated thereinto or applied thereto.

There is still further provided a method for preparing a dynamoelectric machine rotor, which comprises the steps of preparing a tape by impregnating a resin into or applying a resin to at least of one of a substrate sheet with a hole and a netlike substrate, and filling the hole or meshes with the resin; winding the tape on an outer circumference of a field coil which is wound on a field core through a bobbin; and melting the tape by a heat treatment.

There is still further provided a method for preparing a dynamoelectric machine rotor, which comprises the steps of winding a tape of resin on an outer circumference of a field coil which is wound on a field core through a bobbin; and melting the tape by heat treatment.

In the method, the tape may be prepared by impregnating a resin into or applying a resin to a substrate sheet with a hole or a netlike substrate, and filling the hole or meshes with the resin.

In accordance with the dynamoelectric machine rotor thus constructed, the hole can be formed in the substrate sheet forming the outer circumferential tape, or in the outer circumferential tape itself to improve ventilation performance of the outer circumferential tape. As a result, heat which is caused from the field coil due to electric power generation can be dissipated out of the winding, and the coil can be prevented from being unwound due to a centrifugal force.

When the substrate sheet forming the outer circumferential tape is provided with a projection or recess, the area that heat caused by the field coil due to electric power generation dissipates can be expanded to improve cooling performance.

When the substrate sheet forming the outer circumferential tape is made of a netlike sheet, the area of exposed portions of the field coil can increase not only to improve cooling performance but also to prevent the coil from being unwound due to a centrifugal force.

When the circumferential tape of resin which can be melted by heat treatment, the melted resin is impregnated into between adjoining portions of the field coil by the heat treatment after having wound the tape on the outer circumference of the field coil. The resin is hardened to prevent the coil from unwinding. The coil has the outer circumference exposed in the entirety to improve cooling performance.

When the tape which is continuously wound on the inner circumference, the sides and the outer circumference of the wound field coil unit is provided at least at the coil wind-start portion and the coil wind-completion portion, the number of required parts can be decreased. In addition, a structure having excellent ventilation can be provided to improve cooling performance of the coils and the coil can be prevented being unwound due to a centrifugal force.

When the cord which has a resin impregnated thereinto or applied thereto is used to fix the field coil, the area of the exposed portion of the field coil can be increased to improve cooling performance and to prevent the coil from being unwound due to a centrifugal force.

Figure 4:
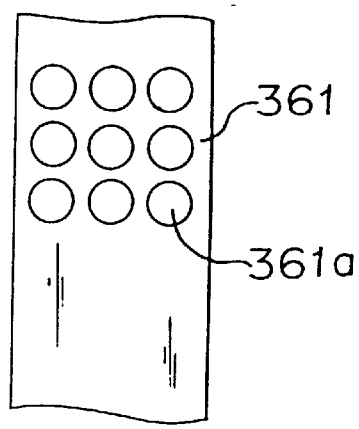
Figure 4:
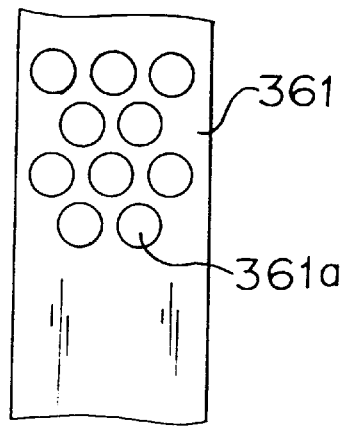
Figure 4:
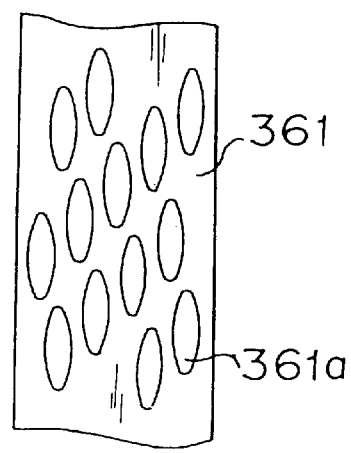
Figure 5:
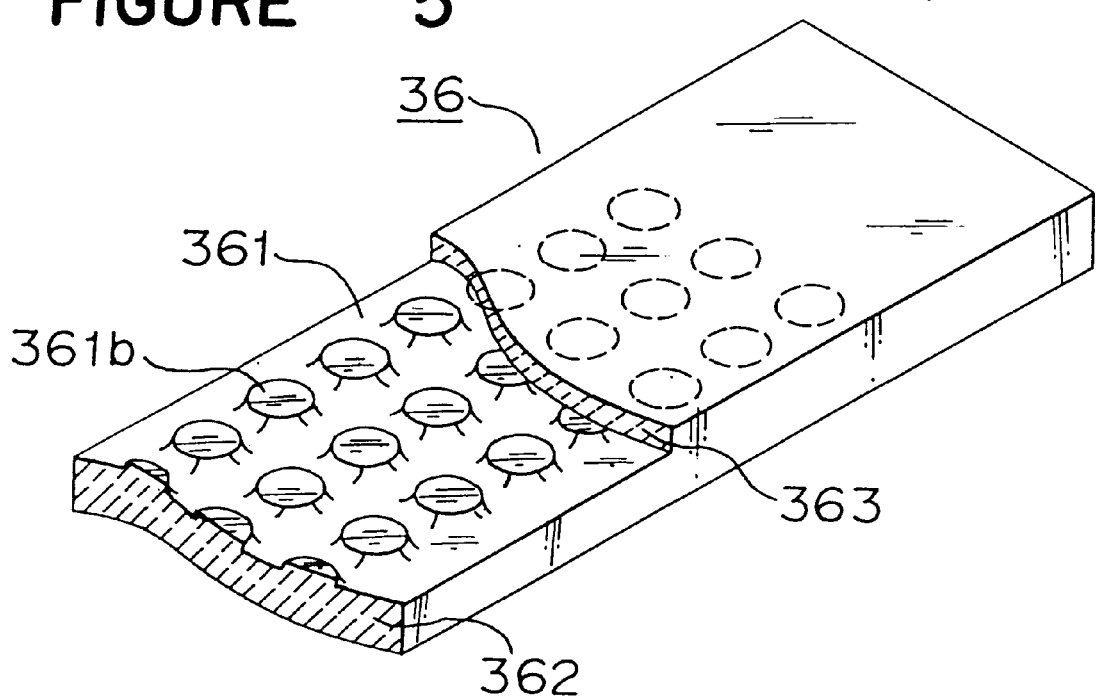
Figure 6:
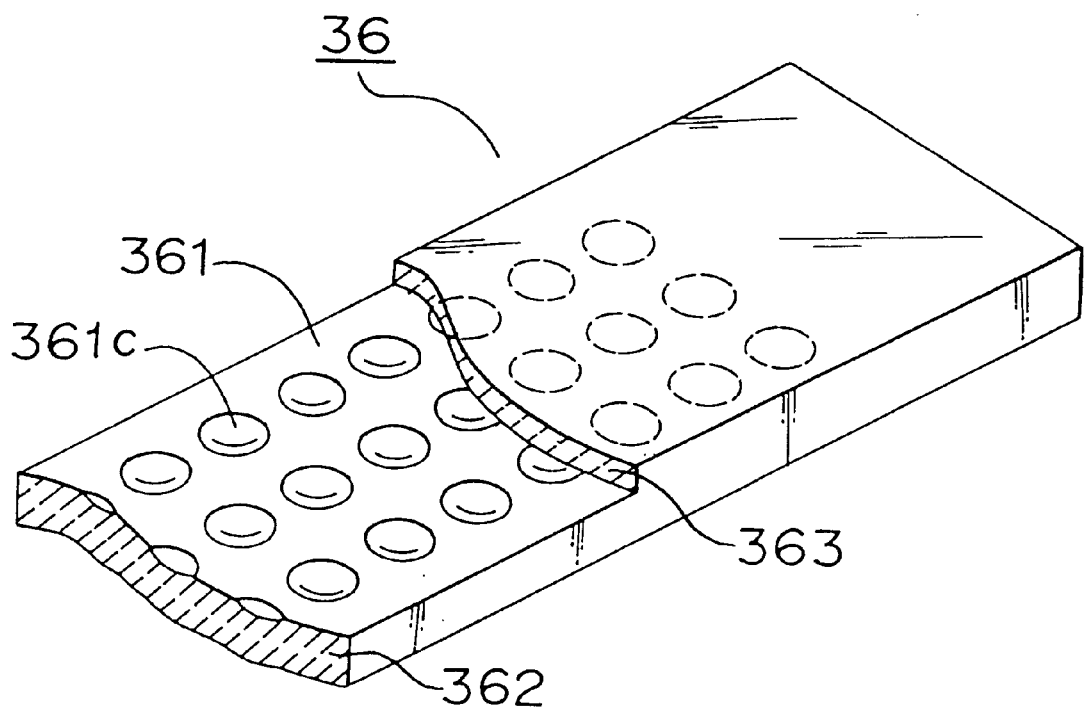
Figure 7:
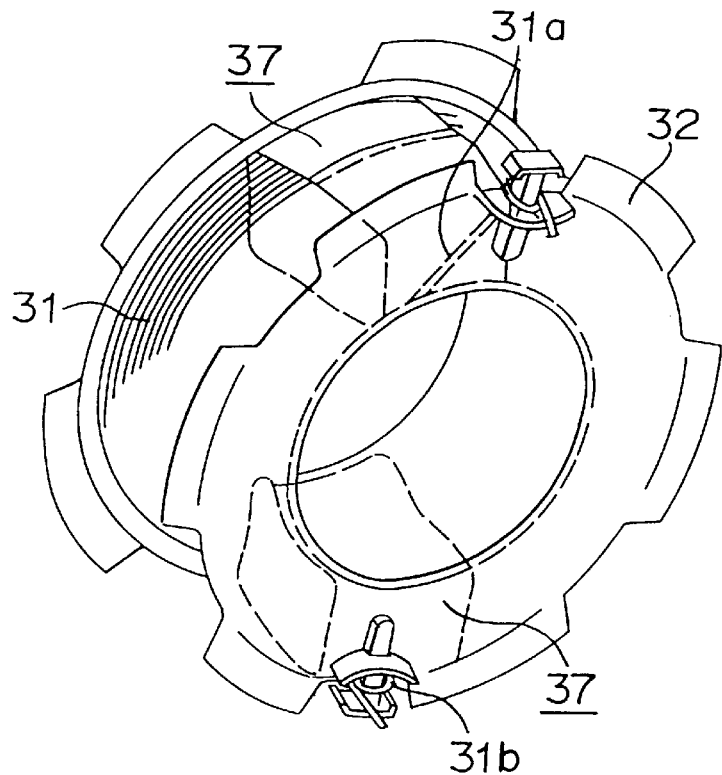
Figure 8:
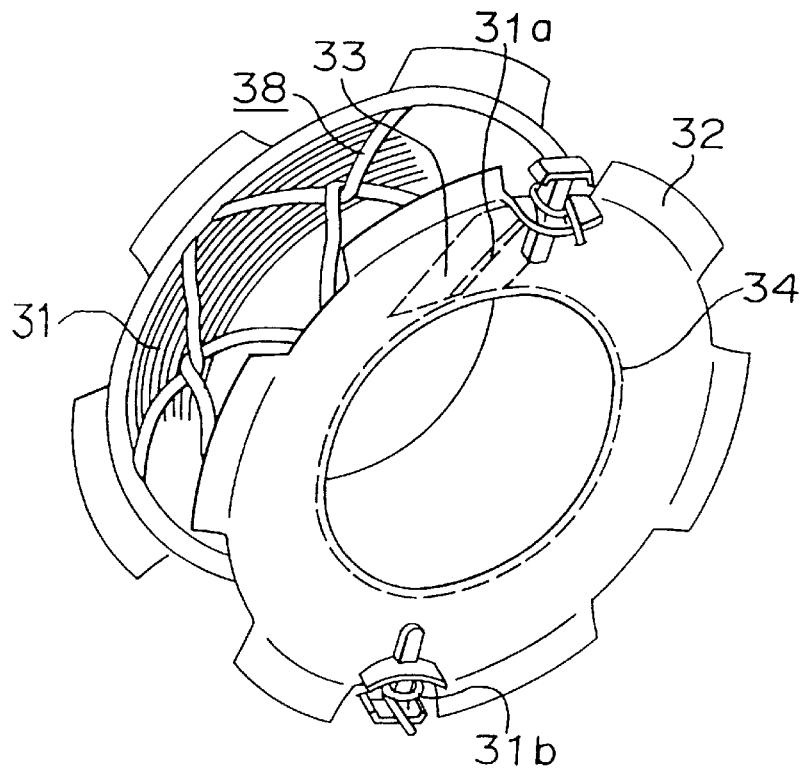
Figure 9:
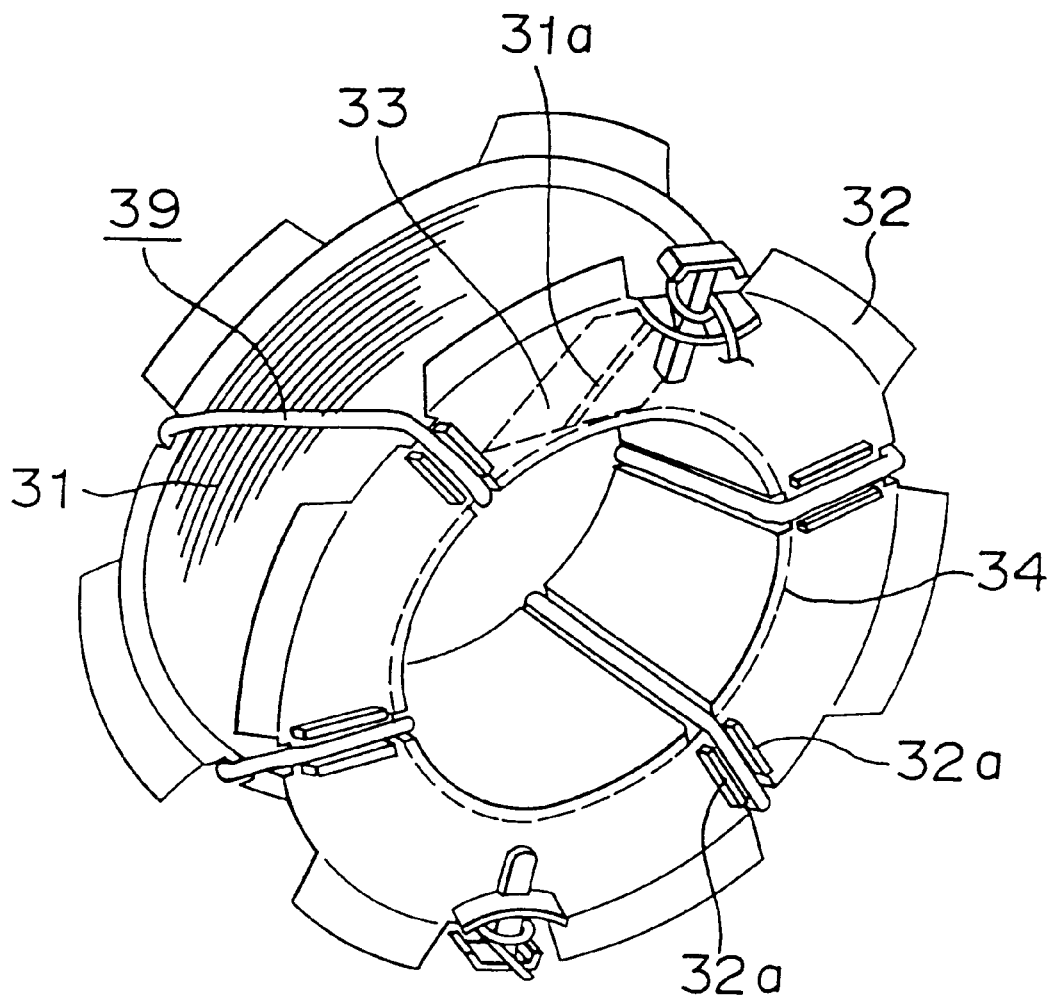
Figure 10:
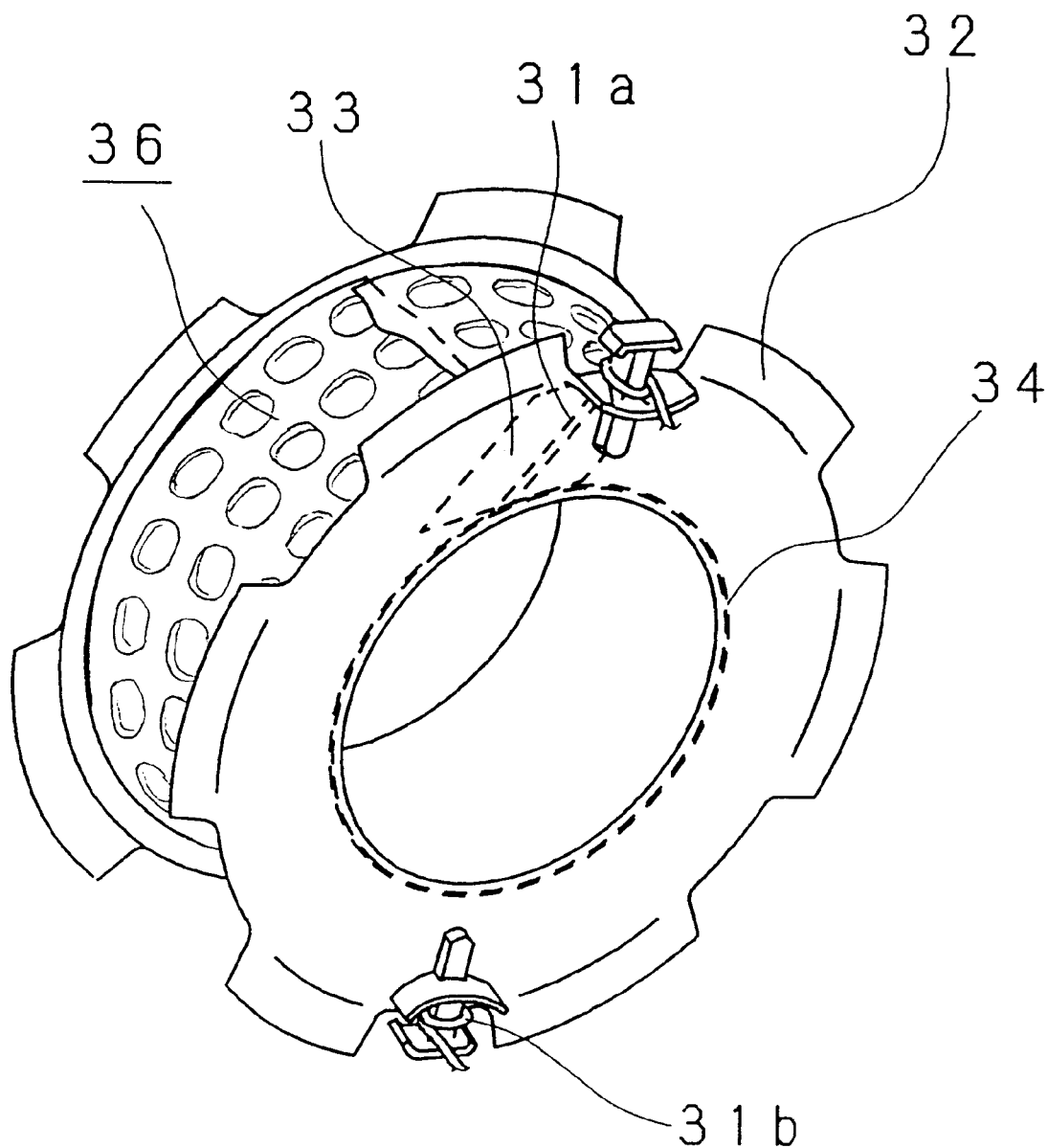
Figure 10B:
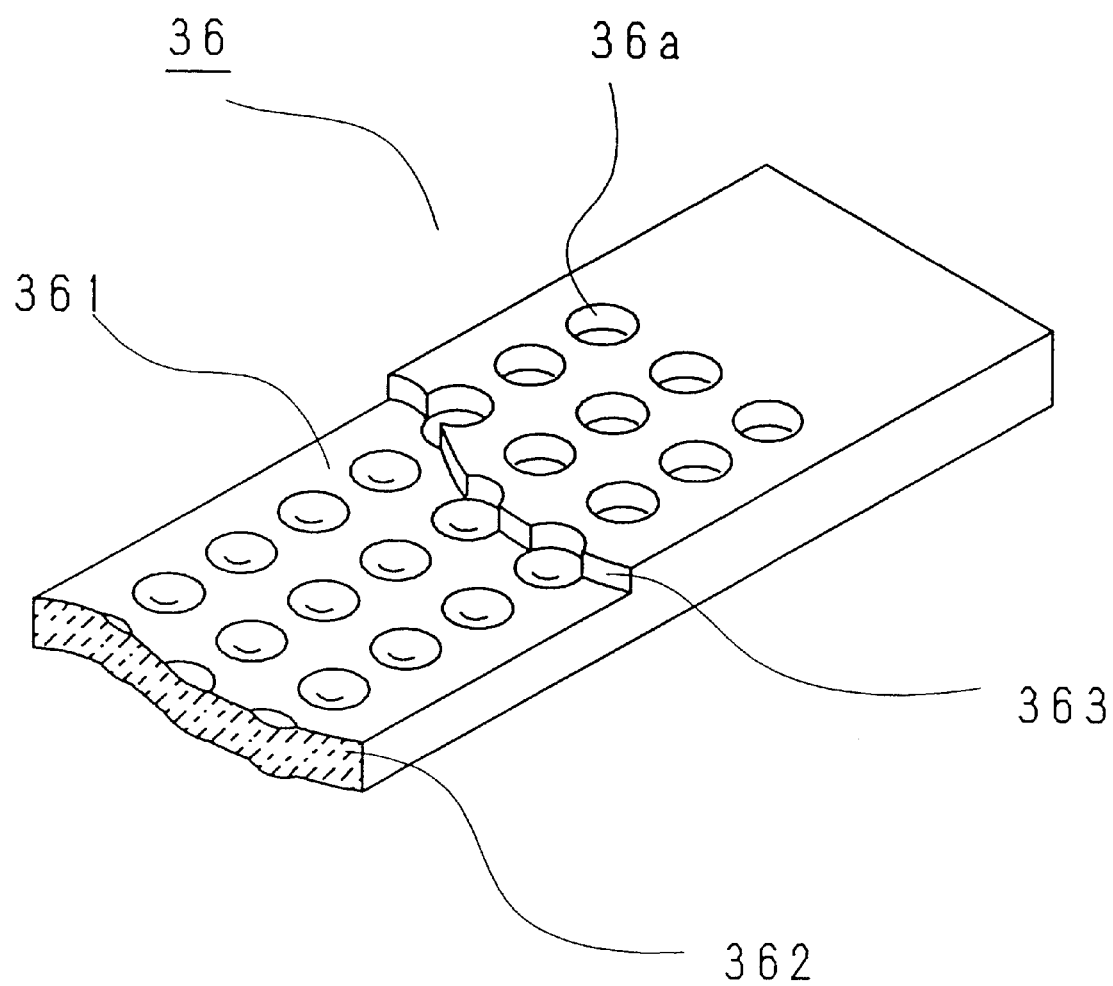
Figure 11:
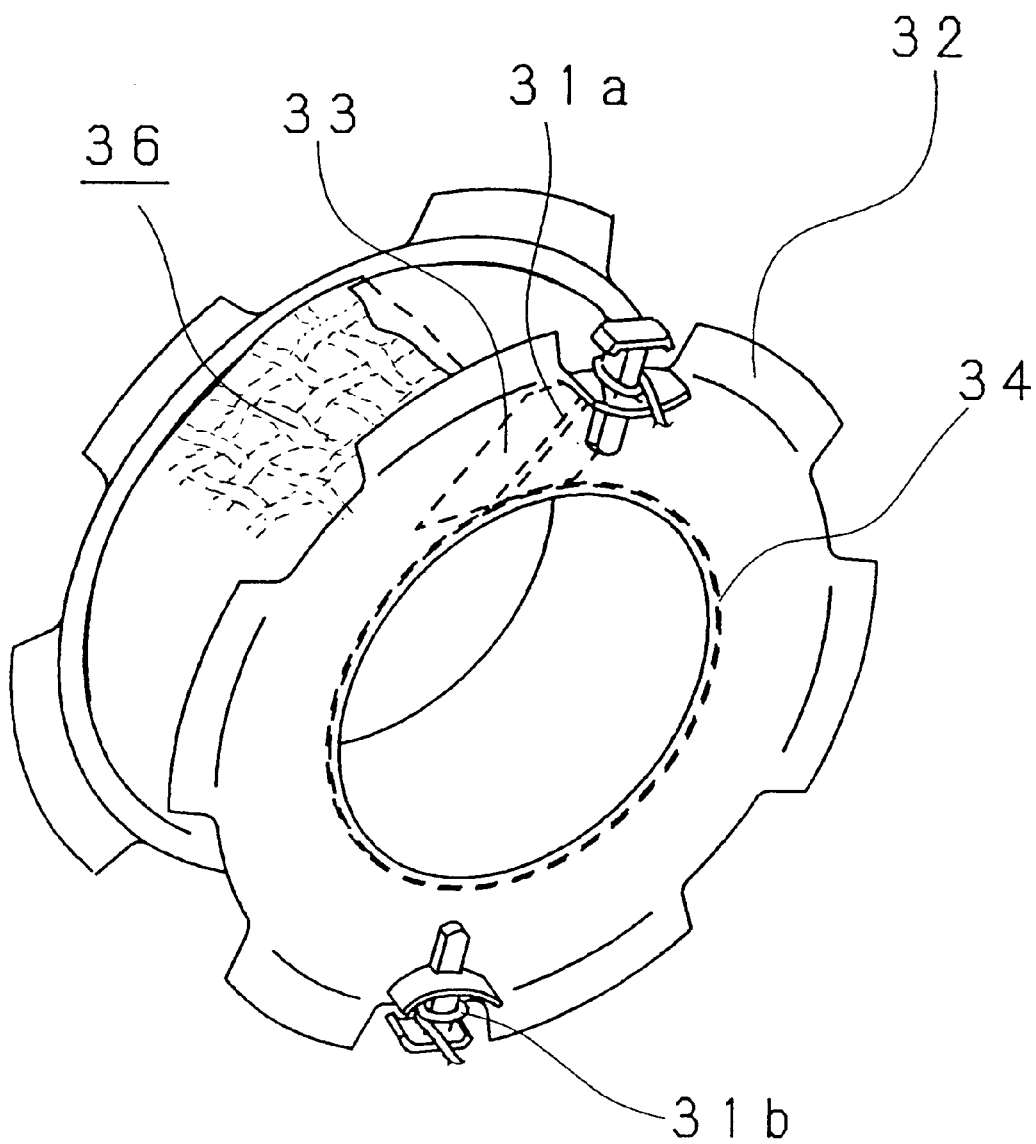
Figure 11B:
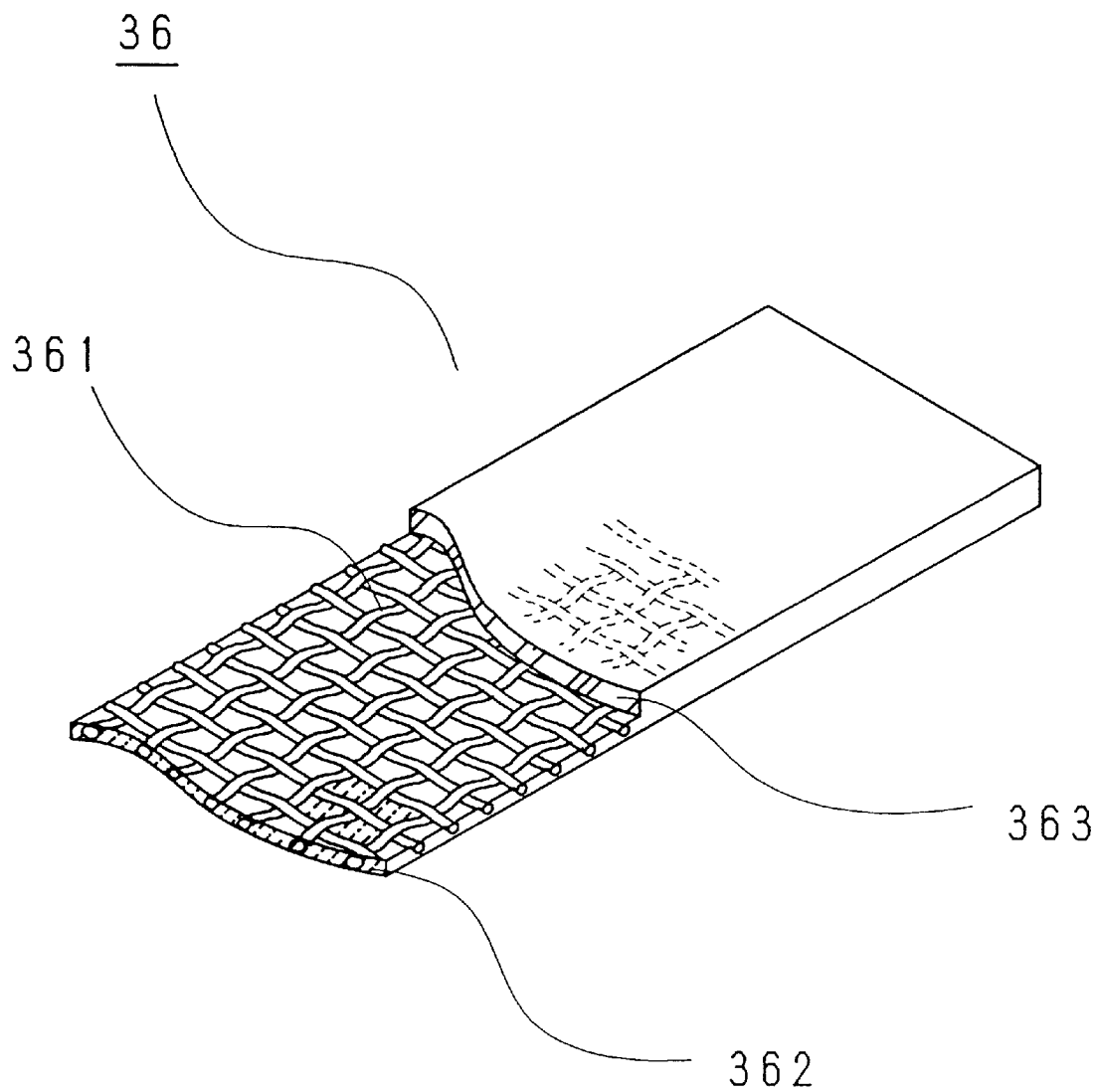
Figure 12A:
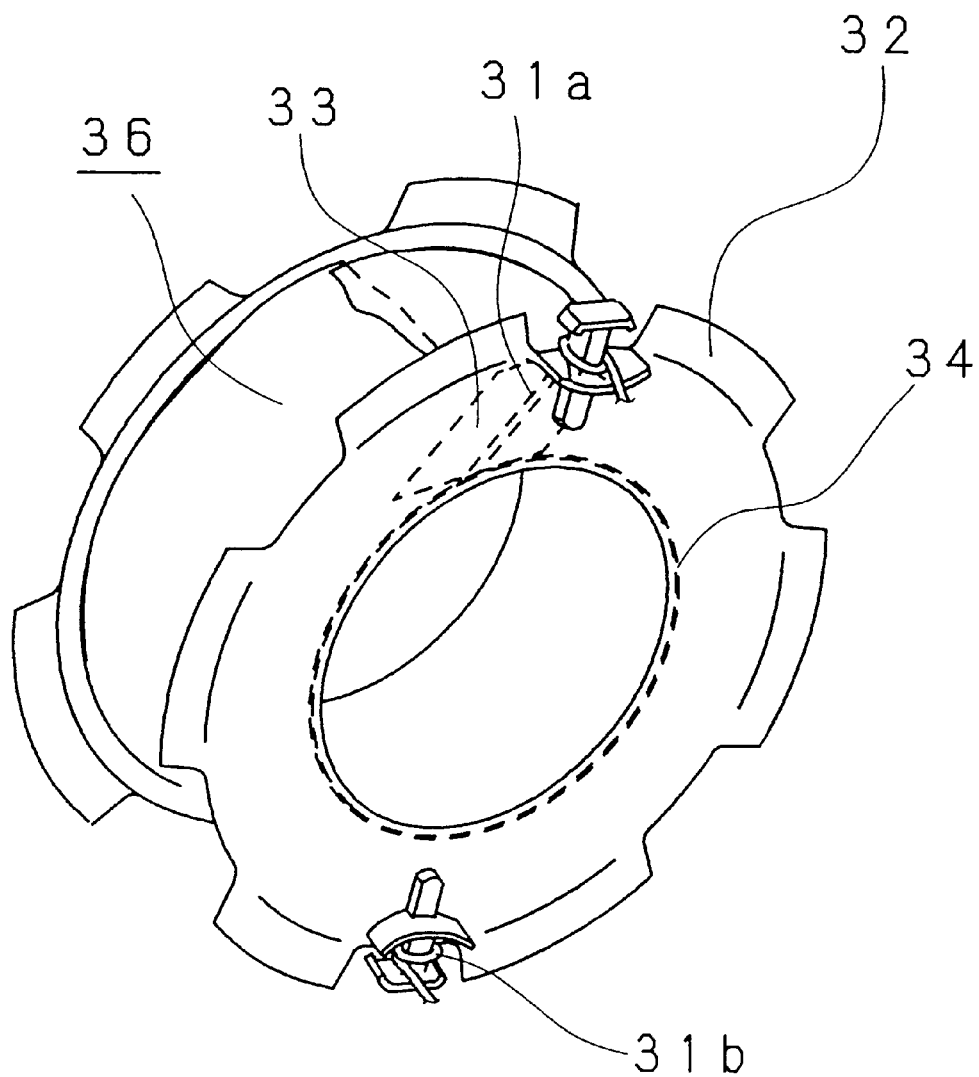
Figure 12:
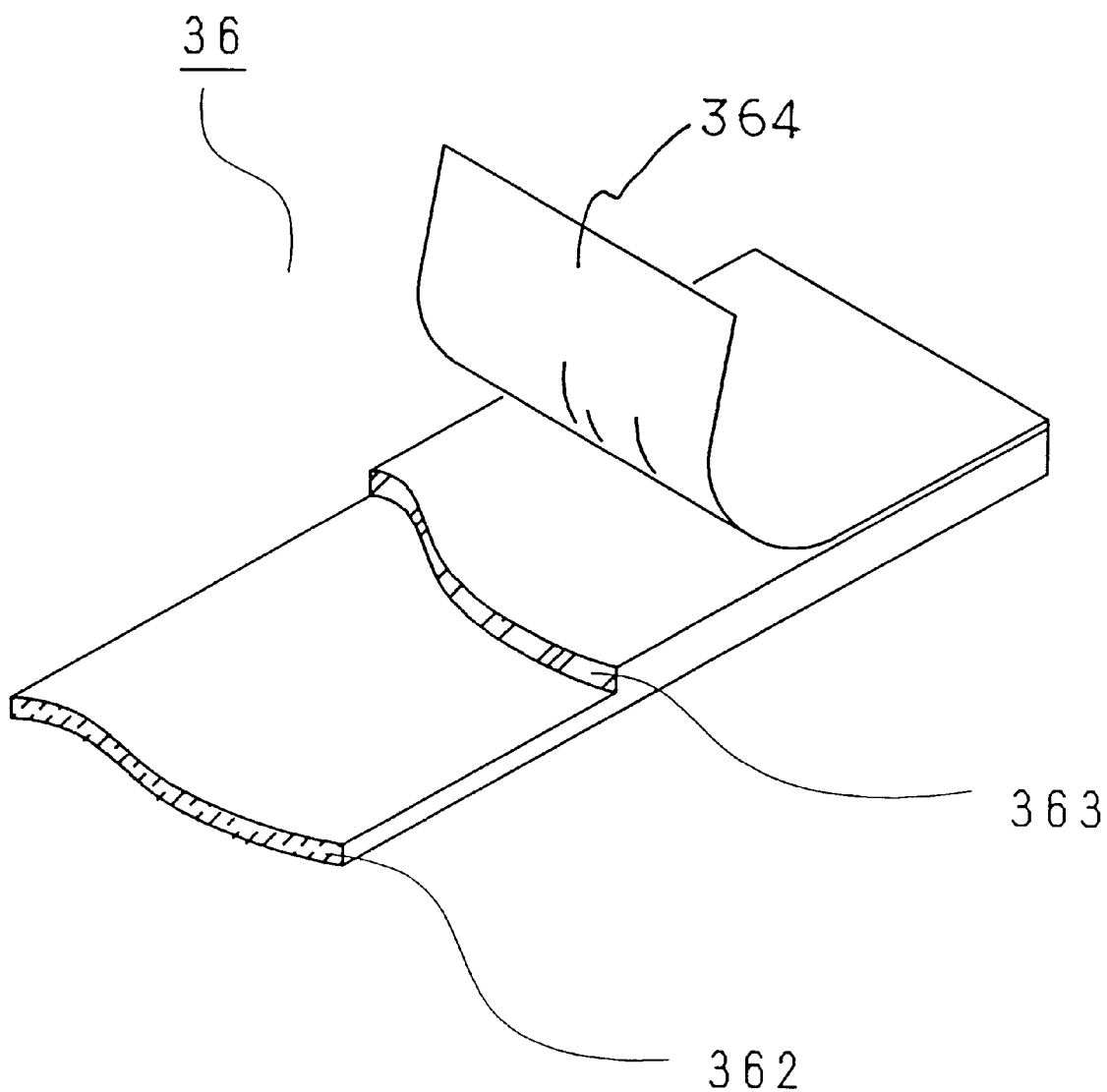
Figure 13:
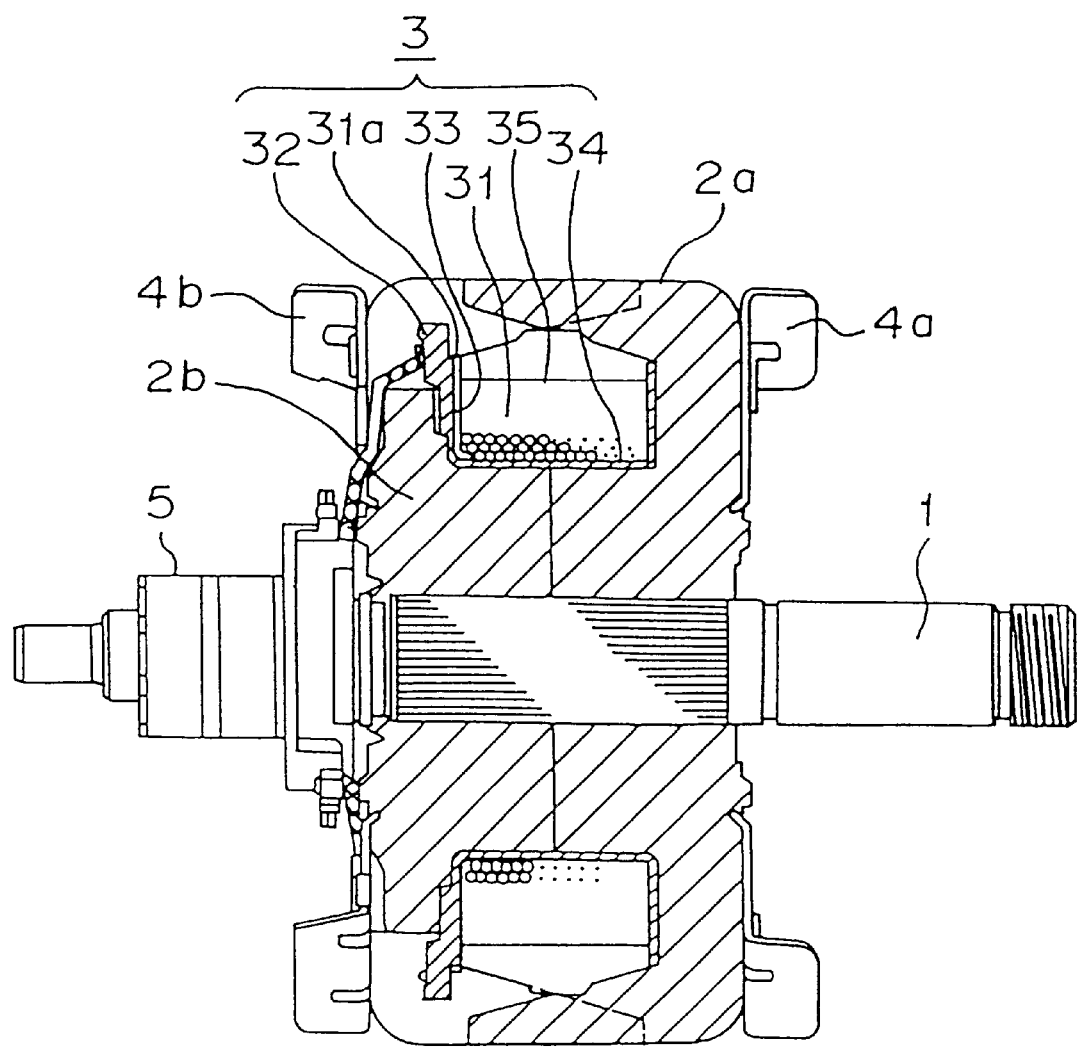
Figure 14:
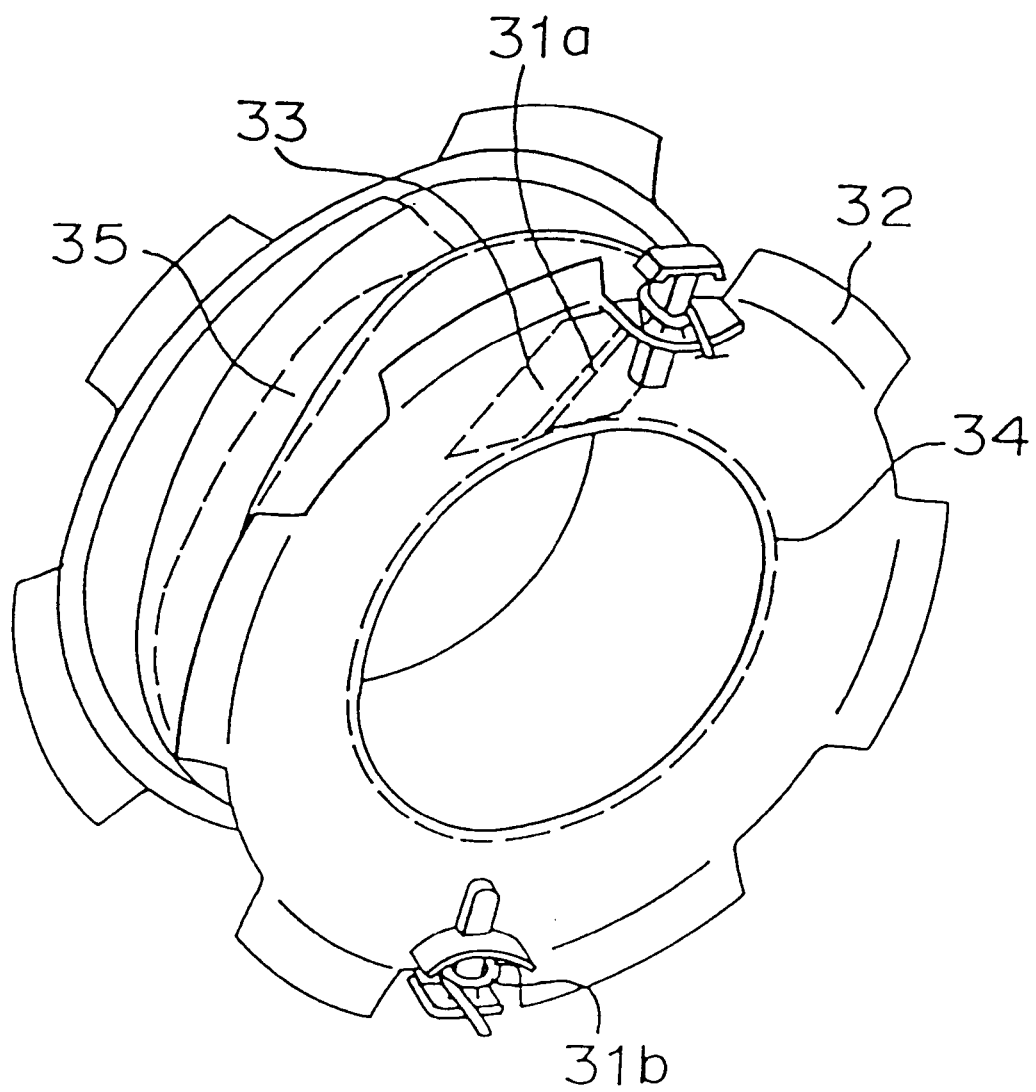

FIGS. 4(a), (b) and (c) are schematic views showing various shapes and arrangements of the holes which are formed in the outer circumferential tape substrate of the rotor of the embodiment;

FIG. 5 is a perspective view showing the outer circumferential tape according to a third embodiment of the present invention;

FIG. 6 is a perspective view showing the outer circumferential tape according to a fourth embodiment of the present invention;

FIG. 7 is a perspective view showing the coil ASSY according to a seventh embodiment of the present invention;

FIG. 8 is a perspective view showing the coil ASSY according to a twelfth embodiment of the present invention;

FIG. 9 is a perspective view showing the coil ASSY according to a thirteenth embodiment of the present invention;

FIG. 10a is a perspective view showing the coil ASSY of the a.c. generator rotor of a second embodiment;

FIG. 10b is a perspective view showing the outer circumferential tape of the rotor, which has holes formed in itself according to the second embodiment of the present invention;

FIG. 11a is a perspective view showing the coil ASSY of the a.c. generator rotor of a fifth embodiment;

FIG. 11b is a perspective view showing the outer circumferential tape of the rotor, which includes a substrate sheet made of a netlike sheet according to the fifth embodiment of the present invention;

FIG. 12a is a perspective view showing the coil ASSY of the a.c. generator rotor of a sixth embodiment;

FIG. 12b is a perspective view showing the outer circumferential tape of the sixth embodiment, which is made of a resin member;

FIG. 13 is a cross-sectional view showing a conventional a.c. generator rotor for vehicles; and FIG. 14 is a perspective view showing the coil ASSY of the conventional a.c. generator rotor for vehicles.

Now, the present invention will be described in detail with reference to preferred embodiments illustrated in the accompanying drawings.

EMBODIMENT 1

Figure 1:
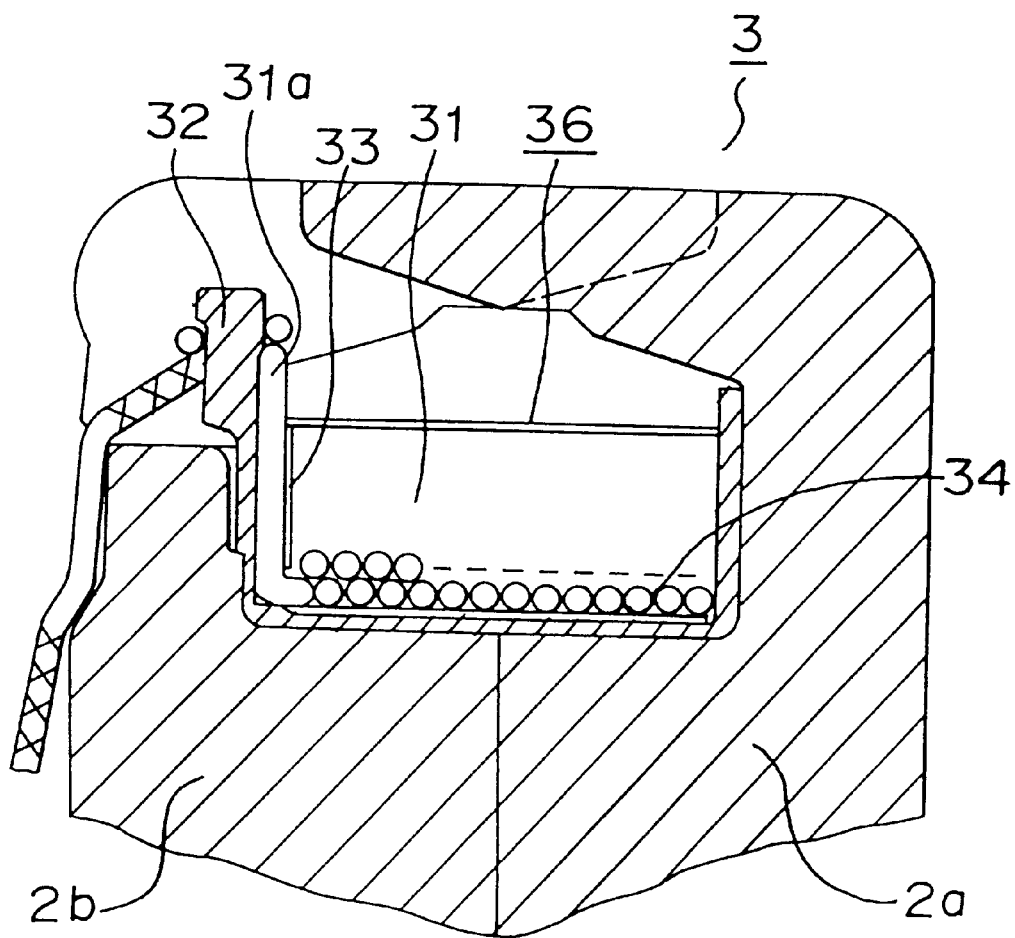
FIG. 1 is a cross-sectional view showing the essential parts of the a.c. generator rotator for vehicles according to an embodiment of the present invention.
Figure 2:
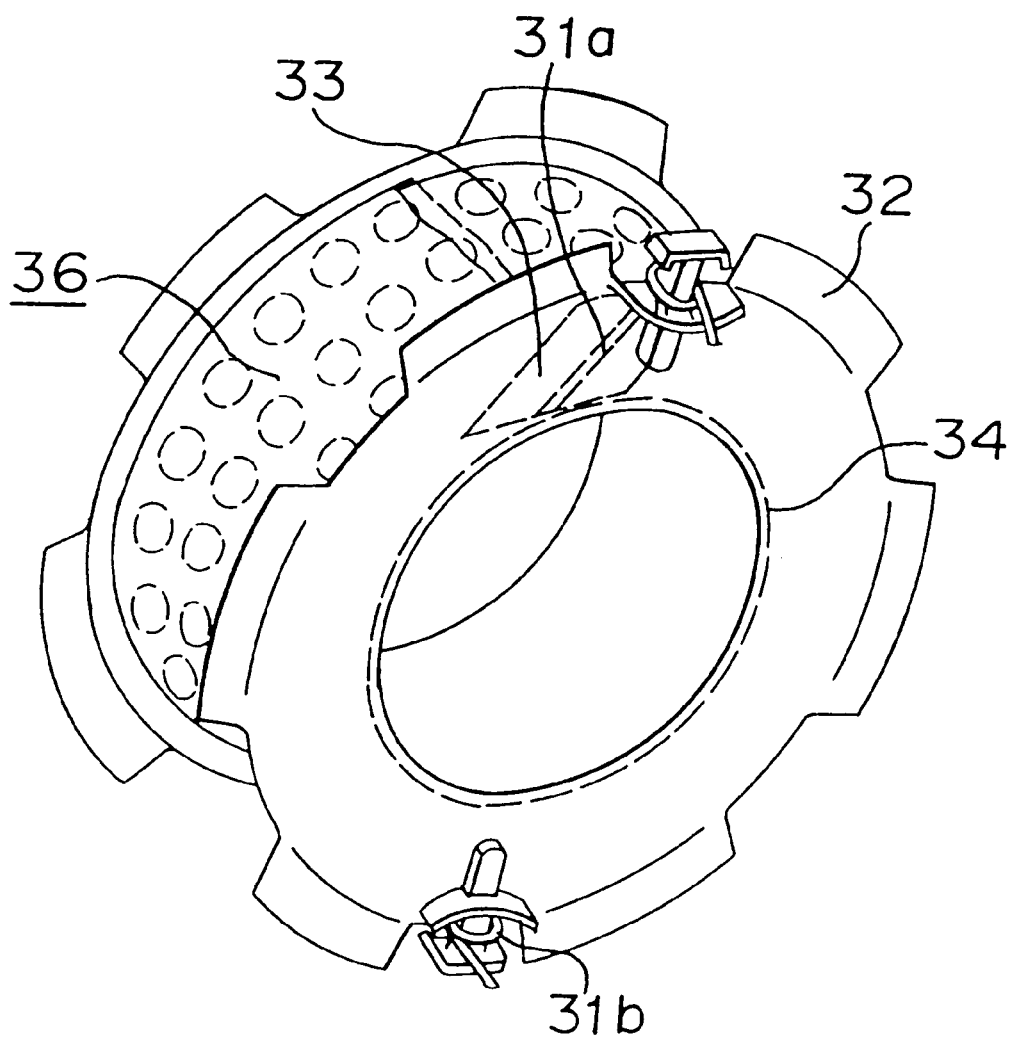
FIG. 2 is a perspective view showing the coil ASSY of the a.c. generator rotor of the embodiment.

FIG. 1 is a cross-sectional view showing the essential parts of the a.c. generator rotor for vehicle according to a first embodiment of the present invention. In FIG. 1 the members indicated by reference numeral 2a, 2b, 3, 31, 31a, 32, 33 and 34 are similar to those of the conventional rotors, and explanation of those members will be omitted. Reference numeral 36 designates the outer circumferential tape according to the present invention. FIG. 2 is a perspective view showing the coil ASSY shown in FIG. 1.

Figure 3:
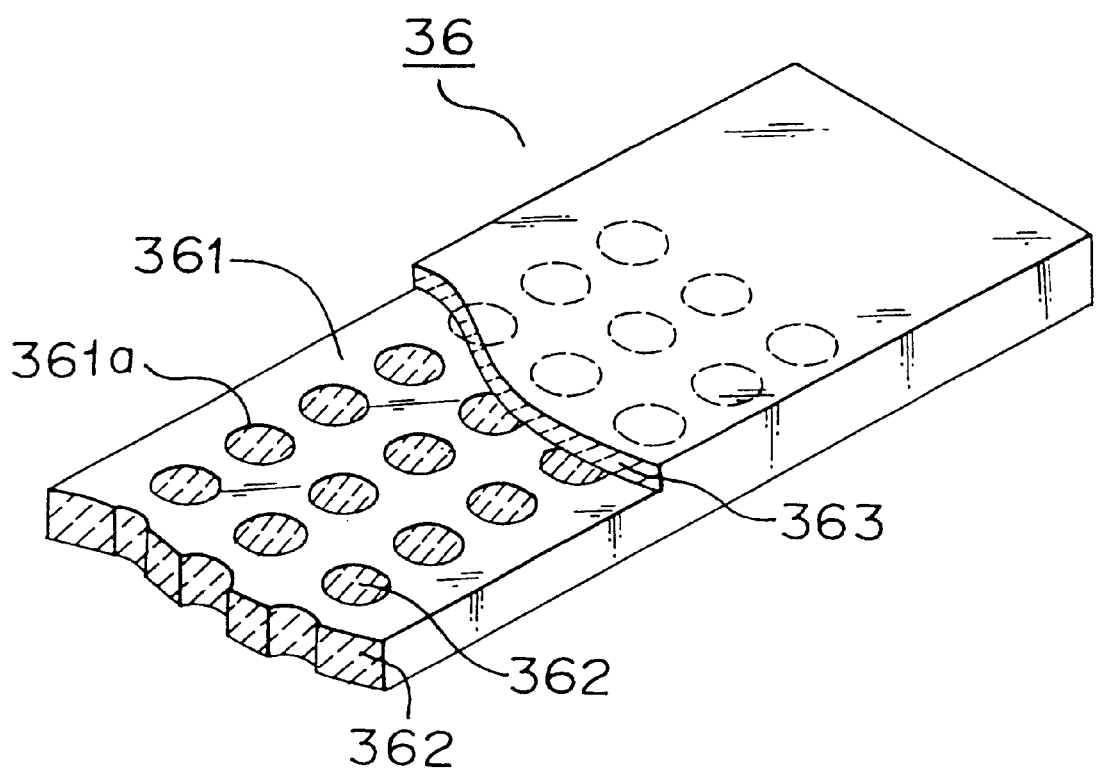
FIG. 3 is a perspective view showing the outer circumferential tape of the a.c. generator rotor of the embodiment, which includes a substrate sheet with holes.

In FIG. 3, there is shown the outer circumferential tape 36, which comprises a substrate sheet 361, a resin 362 impregnated into the substrate, and a resin 363 applied to one of the surfaces of the substrate after impregnation. The substrate 361 is made of e.g. unwoven fabric, and the resins 362 and 363 are e.g. epoxies, at least one of which has adhesive property. Reference numeral 361a designates holes which are formed in that substrate sheet 361, and which are filled with the resin 362 after impregnation. In FIGS. 4(a), (b) and (c), there are shown examples of the shape and arrangement of the holes 361a. In the example shown in FIG. 4a, a plurality of circular holes are formed in a triple file in the longitudinal direction of the substrate sheet. In the example shown in FIG. 4b, a plurality of circular holes are formed in such a manner that holes in a trio and holes in a duo are repeatedly alternating. In the example shown in FIG. 4c, a plurality of elliptical holes are formed so as to successively shift one another in the longitudinal direction of the substrate sheet.

In a heat treatment process for preparation of the rotor according to the embodiment, the resins 362 and 363 of the outer circumferential tape which has been wound on the field coil 31 are melted to fill in between adjoining portions of the field coil, and then are hardened again to constitute the field coil 31 into a substantially single unit. As a result, most of the holes 31a are exposed, thereby offering an effect like an increase in the surface roughness of the field coil 31, and decreasing heat-conducting resistance with cooling air to improve cooling performance.

EMBODIMENT 2

Although in the first embodiment the holes are formed in the substrate 361 which forms a part of the outer circumferential tape 6, the holes can be formed in the outer circumferential tape 36 itself (see FIGS. 10a, 10b), offering similar advantages.

EMBODIMENT 3

As shown in FIG. 5, the substrate 361 of the outer circumferential tape 36 can have a plurality of projections 361b formed thereon. According to this embodiment, the area that the field coil can dissipate heat can be enlarged, offering similar advantages.

EMBODIMENT 4

As shown in FIG. 6, the substrate 361 which forms a part of the outer circumferential tape 36 can have a plurality of recesses 361c formed therein, offering advantages similar to the third embodiments

EMBODIMENT 5

The substrate of the outer circumferential tape 36 may be made of a netlike sheet (see FIGS. 11a, 11b) to increase the area of the exposed portions of the coil while maintaining required strength for the tape.

EMBODIMENT 6

Although in the first embodiment the outer circumferential tape 36 is constituted by the substrate 361 and the resins, the tape may be constituted by only resin materials 362, 363 (FIGS. 12a, 12b), offering similar advantages Reference numeral 364 designates released paper.

EMBODIMENT 7

In FIG. 7, there is shown the coil ASSY according to a seventh embodiment of the present invention. Reference numeral 37 designates tapes which are wound on the wound field coil from its inner circumference (formed by the innermost windings) to its outer circumference (formed by the outermost windings) passing its sides, which are provided at least at a wind-start portion 31a and at a wind-completion portion 31b, and which is made of a material similar to the conventional tape. In other words, as shown in FIG. 7, the tape is wrapped around the field coil in a radial direction. According to this embodiment, the side tape 33 can be eliminated to establish a reduction in the number of required parts. In addition, the coil ASSY can have high heat dissipation performance.

EMBODIMENT 8

The tape according to the seventh embodiment may have an outer circumferential portion constituted by a substrate sheet with a plurality of holes as stated with respect to the first embodiment. In this case, similar advantages are obtainable.

EMBODIMENT 9

The tape according to the seventh embodiment may have an outer circumferential portion formed with a plurality of holes like the tape of the second embodiment.

EMBODIMENT 10

The tape according to the seventh embodiment may includes a substrate which has a plurality of projection formed thereon like the third embodiment. In this cases similar advantages can be obtained.

EMBODIMENT 11

The tape according to the seventh embodiment can include a substrate which has a plurality of recesses formed therein like the fourth embodiment. In this cases similar advantages can be obtained.

EMBODIMENT 12

In FIG. 8, there is shown the coil ASSY according to a twelfth embodiment of the present invention. Reference numeral 38 designates a cord member which is e.g. a heat-shrinkable type cord which has a resin impregnated thereinto or applied thereto. The cord member fixes the field coil in e.g. a grid pattern. According to this embodiments a heat treatment process for preparation of the rotor causes not only the resin to be melted and hardened but also the cord itself to be shrunk to fix the field coil further firmly.

EMBODIMENT 13

As shown in FIG. 9, the cord member 39 is arranged to wind the field coil together with the bobbin 32 at several locations to obtain similar advantages in a simple structure. When the bobbin has side surfaces formed with cord member guides 32a, the bobbin itself can not be prevented from rotating

We claim:

1. A dynamoelectric machine rotor comprising:
a rotary shaft;
a field core member engaged with the rotary shaft;
a field coil wound on the field core member through a bobbin; and
an outer circumferential tape which is wound on an outer circumference of the field coil to prevent the field coil from unwinding;
wherein the outer circumferential tape includes a substrate sheet provided with at least one of a recess and a projection, and a first resin and a second resin, wherein the first resin is adhesive and the second resin is non-adhesive.

2. A dynamoelectric machine rotor comprising:
a rotary shaft;
a field core member engaged with the rotary shaft;
a field coil wound on the field core member through a bobbin; and
an outer circumferential tape which is wound on an outer circumference of the field coil to prevent the field coil from unwinding;
wherein the outer circumferential tape includes a substrate sheet provided with at least one of a recess and a projection, and a first resin and a second resin, wherein the first resin is adhesive and the second resin is non-adhesive; and
wherein the recess is a circular or elliptical hole.

3. A dynamoelectric machine rotor according to claim 1, wherein the recess is provided by making the substrate sheet of a netlike sheet.

4. A dynamoelectric machine rotor comprising:
a rotary shaft;
a field core member engaged with the rotary shaft;
a field coil wound on the field core member through a bobbin; and
an outer circumferential tape which is wound on an outer circumference of the field coil to prevent the field coil from unwinding, said outer circumferential tape including a first resin and a second resin, wherein the first resin is adhesive and the second resin is non-adhesive;
wherein the outer circumferential tape is provided with a hole formed in at least one of said first and second resins.

5. A dynamoelectric machine rotor comprising:
a rotary shaft;
a field core member engaged with the rotary shaft;
a field coil wound on the field core member through a bobbin; and
an outer circumferential tape which is made of only resin materials, and which is wound on an outer circumference of the field coil to prevent the field coil from unwinding;

wherein the outer circumferential tape is melted by a heat treatment.

6. A dynamoelectric machine rotor comprising:

a rotary shaft;

a field core member engaged with the rotary shaft;

a field coil wound on the field core member through a bobbin, said field coil having a coil wind-start portion connected to the bobbin at one point and a coil wind-completion portion connected to the bobbin at another point, said field coil being wound around the bobbin such that inner-most windings of said field coil form an inner circumference and outer-most windings of said field coil form an outer circumference;

a first tape wrapped in a radial direction around the inner circumference of said field coil, the outer circumference of said field coil and both sides of said field coil at the coil wind-start portion; and a second tape wrapped in a radial direction around the inner circumference of said field coil, the outer circumference of said field coil and both sides of said field coil at the coil wind-completion portion.

7. A method for preparing a dynamoelectric machine rotor, which comprises the steps of:

preparing a tape by impregnating a first resin into a substrate sheet having one of: a plurality of recesses formed therein and a plurality of projections formed thereon;

applying a second resin to a surface of said substrate sheet;

winding the tape on an outer circumference of a field coil which is wound on a field core through a bobbin: and melting the tape by heat treatment.

8. A method for preparing a dynamoelectric machine rotor, which comprises the steps of:

winding a tape constituted by only resin materials on an outer circumference of a field coil which is wound on a field core through a bobbin; and melting the tape by heat treatment.

9. The dynamoelectric machine rotor according to claim 1, wherein a plurality of discrete projections are formed on the substrate sheet.

10. The dynamoelectric machine rotor according to claim 9, wherein said discrete projections are elliptical.

11. The dynamoelectric machine rotor according to claim 9, wherein said discrete projections are circular.

12. The dynamoelectric machine rotor according to claim 1, wherein a plurality of elliptical recesses are formed in said substrate sheet.

13. The dynamoelectric machine rotor according to claim 1, wherein a plurality of circular recesses are formed in said substrate sheet.

14. The dynamoelectric machine rotor according to claim 1, wherein said recess or projection increases the surface area of said substrate sheet.

15. The dynamoelectric machine rotor according to claim 1, wherein the substrate sheet is made of an unwoven fabric.

16. A dynamoelectric machine rotor comprising:

a rotary shaft;

a field core member engaged with the rotary shaft;

a field coil wound on the field core member through a bobbin; and an outer circumferential tape which is wound on an outer circumference of the field coil to prevent the field coil from unwinding;

wherein the outer circumferential tape includes a substrate sheet provided with at least one of a recess and a projection and a first resin and a second resin, wherein the first resin is adhesive and the second resin is non-adhesive; and wherein the first resin is impregnated in the substrate sheet and the second resin is formed on a surface of the substrate sheet.

17. The dynamoelectric machine rotor according to claim 4, wherein said outer circumferential tape further includes a substrate sheet made of an unwoven fabric.

18. The dynamoelectric machine rotor according to claim 6, wherein the tape includes a substrate sheet which is provided with at least one of a recess and a projection.

19. The dynamoelectric machine rotor according to claim 6, wherein the tape includes a substrate sheet which is provided with at least one hole.

20. A dynamoelectric machine rotor comprising:

a rotary shaft;

a field core member engaged with the rotary shaft;

a field coil wound on the field core member through a bobbin; and a cord for fixing the field coil, which has a resin impregnated thereinto or applied thereto, wherein said cord is fixed to said field coil in a grid pattern.

21. A dynamoelectric machine rotor comprising:

a rotary shaft;

a field core member engaged with the rotary shaft;

a field coil wound on the field core member through a bobbin; and a cord for fixing the field coil, which has a resin impregnated thereinto or applied thereto, wherein said cord is secured to said bobbin.

22. The dynamoelectric machine rotor according to claim 20, wherein said cord is a heat-shrinkable cord.

* * * * *